United States Patent [19]

Yoshitsugu et al.

[11] 4,392,684
[45] Jul. 12, 1983

[54] VEHICLE BODY STRUCTURE

[75] Inventors: Seikichi Yoshitsugu, Sayama; Minoru Shimatsu, Koganei, both of Japan

[73] Assignee: Nissan Motor Company Limited, Yokohama, Japan

[21] Appl. No.: 239,031

[22] Filed: Feb. 27, 1981

[30] Foreign Application Priority Data

Feb. 29, 1980 [JP] Japan ................................. 55-27020

[51] Int. Cl.³ .......................................... B62D 25/02
[52] U.S. Cl. .................................. 296/185; 296/193; 296/203
[58] Field of Search ............... 296/185, 181, 193, 194, 296/196, 198, 203, 205

[56] References Cited

U.S. PATENT DOCUMENTS 3,423,122 1/1969 Wessells ............................ 296/185
3,697,124 10/1972 Wessells ............................ 296/185

FOREIGN PATENT DOCUMENTS 552667 4/1943 United Kingdom ............... 296/185
1291478 10/1972 United Kingdom ............... 296/185

*Primary Examiner*—Richard A. Bertsch

[57] ABSTRACT

A vehicle body structure, comprises: a pair of rear wheel housing each having inner and outer housing half portions, and inner and outer flange portions respectively extending radially outwardly from the outer circumferences of said housing half portions, said inner and outer flange portions being integral with said housing half portions and connected to each other for forming in combination said rear wheel housing; said outer flange portion being bent in a lateral direction of said rear wheel housing; a pair of rear pillar inner panels each having a lower end portion connected to each of said outer flange portions; and a pair of side sills extending in parallel with each other and projecting forwardly from said rear wheel housings, respectively, each of said side sills having inner and outer side sill half portions, and inner and outer flange portions respectively extending upwardly from the upper ends of said side sill half portions, said inner and outer flange portions being integral with said side sill half portions and connected to each other for forming in combination said side sill, said inner and outer flange portions of said side sill extending in longitudinal directions of said side sill to be bent in a lateral direction of said side sill in longitudinal alignment with said inner flange portion of rear wheel housing for sandwiching said inner flange portion of said rear wheel housing therebetween.

3 Claims, 7 Drawing Figures

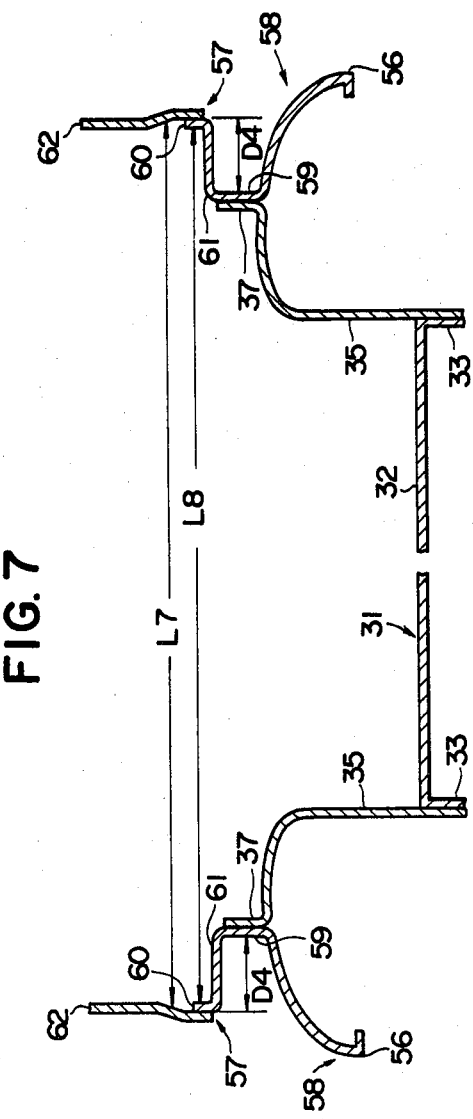

VEHICLE BODY STRUCTURE

FIELD OF THE INVENTION

The present invention relates to a vehicle body structure for use in an automotive vehicle such as a passenger can or the like, and in particular to the improvement of a vehicle body structure having a pair of rear wheel housings and a pair of side sills each connected to the rear wheel housing.

BACKGROUND OF THE INVENTION

Conventionally, there was proposed a wide variety of vehicle body structures one of which is shown in FIGS. 1 and 2. The vehicle body structure comprises a rear floor panel 1 and a pair of rear wheel housings 2 respectively having inner and outer housing half portions 3 and 4, the formers of which are welded to the both lateral ends of the rear floor panel 1. Each of rear wheel housings 2 further comprises inner and outer flange portions 5 and 6 respectively extending radially outwardly from the outer circumferences of the housing half portions 3 and 4. The inner and outer flange portions 5 and 6 are welded to each other so as to form in combination the rear wheel housings 2 respectively in conjunction with the inner and outer housing half portions 3 and 4, so that the rear wheel housings 2 can partially accommodate therewithin respective rear road wheels, not shown, as in a well known manner. As will be best seen in FIG. 2, the inner flange portions 5 respectively have upper sections which extend over the outermost ends of the outer flange portions 6 and to which a pair of rear pillar inner panels 7 are welded at their lower end portions, respectively. The lower portions of the rear pillar inner panels 7 are parallel with and spaced apart from each other by a distance L1 which is determined in such a manner as to meet the requirement of a vehicle having a certain width, so that the upper sections of the inner flange portions 5 are parallel with and spaced apart from each other by a distance L2 approximately equal to the distance L1. Reference numeral 8 designates a pair of side sills each of which has inner and outer side sill half portions 9 and 10, the former of which is welded to the lateral end of the rear floor panel 1. Each of the side sills 8 further has inner and outer flange portions 11 and 12 respectively extending upwardly from the upper ends of the side sill half portions 9 and 10 and welded to each other for forming in combination the side sill 8 in conjunction with the inner and outer side sill half portions 9 and 10.

In FIG. 3, a vehicle body structure is shown and used for a vehicle having another width which is greater than that of the vehicle body structure described hereinbefore, in which structural components similar to those forming part of the vehicle body structure shown in FIGS. 1 and 2 are designated by like reference numerals. The vehicle body structure comprises a pair of inner housing half portions 13 respectively welded to the both lateral ends of the rear floor panel 1, a pair of outer housing half portions 14 arranged laterally outwardly of the inner housing half portions 13, respectively, a pair of inner flange portions 15 extending radially outwardly from the outer circumferences of the inner housing half portions 13, and a pair of outer flange portions 16 extending radially outwardly from the outer circumferences of the outer housing half portions 14 and welded to the inner flage portions 15, respectively. The vehicle body structure shown in FIG. 3 further comprises a pair of rear pillar inner panels 17 which are welded to the upper sections of the inner flange portions 13, respectively, as in the case of the vehicle body structure shown in FIG. 2 and which are parallel with and spaced apart from each other by a distance L3 greater than the distance L1. The upper sections of the inner flange portions 13 are spaced apart from each other by a distance L4 greater than the distance L2.

From comparison of the vehicle body structures as shown in FIGS. 2 and 3, it will be understood that the inner housing half portion 3 has a width W1 different from the width W2 of the inner housing half portion 13 and that the outer housing half portion 4 has a width W3 different from the width W4 of the outer housing half portion 14. This results from the reason that the widths W1 and W3 should be respectively varied to the widths W2 and W4 when the didtance L4 is varied from the distance L2 in accordance with the variation of the vehicle widths. For this reason, it is neceassary to produce not only a number of outer housing half portions 4 and 14 with different widths W3 and W4 but also a number of inner housing half portions 3 and 13 with different widths W1 and W2. It is therefore required to machine many different types of dies for producing the inner housing half portions 3 and 13 and the outer housing half portions 4 and 14 when the vehicles with different widths are manufactured. This requires a considerable cost as well as excessive time and labour for storing these housing half portions.

This invention contemplates elimination of these drawbacks inherent in the conventional vehicle body structure and provision of the improvement of the vehicle body structure which requires only one type or configuration of inner housing half portion to manufacture vehicles even if the vehicles are different in lateral width from one another.

SUMMARY OF THE INVENTION

In accordance with the present invention, there is provided a vehicle body structure, comprising a pair of rear wheel housing each having inner and outer housing half portions, and inner and outer flange portions respectively extending radially outwardly from the outer circumferences of the housing half portions, the inner and outer flange portions being integral with the housing half portions and connected to each other for forming in combination the rear wheel housing, the outer flange portion being bent in a lateral direction of the rear wheel housing, a pair of rear pillar inner panels each having a lower end portion connected to each of the outer flange portions, and a pair of side sills extending in parallel with each other and projecting forwardly from the rear wheel housings, respectively, each of the side sills having inner and outer side sill half portions, and inner and outer flange portions respectively extending upwardly from the upper ends of the side sill half portions, the inner and outer flange portions being integral with the side sill half portions and connected to each other for forming in combination the side sill, the inner and outer flange portions of the side sill extending in longitudinal directions of the side sill to be bent in a lateral direction of the side sill in longitudinal alignment with the inner flange portion of said rear wheel housing for sandwiching the inner flange portion of the rear wheel housing therebetween. By preference, each of the outer flange portions forming part of the rear wheel housing includes a lower section, an upper section offset outwardly from the lower section in a lateral direction of the rear wheel housing, and an intermediate section integrally connecting the lower and upper section. Each of the inner and outer flange portions forming part of the side sill may include a fore section, a rear section offset laterally inwardly from the fore section, and an intermediate section integrally connecting the fore and rear sections.

BRIEF DESCRIPTION OF THE DRAWINGS

The features and advantages of the vehicle body structure according to the present invention will more clearly be understood from the following detailed description taken in conjunction with the accompanying drawings, in which;

FIG. 7 is a fragmentary cross-sectional view of the vehicle body structure illustrated in FIG. 6.

DESCRIPTION OF THE PREFERRED EMBODIMENT

Figure 1:
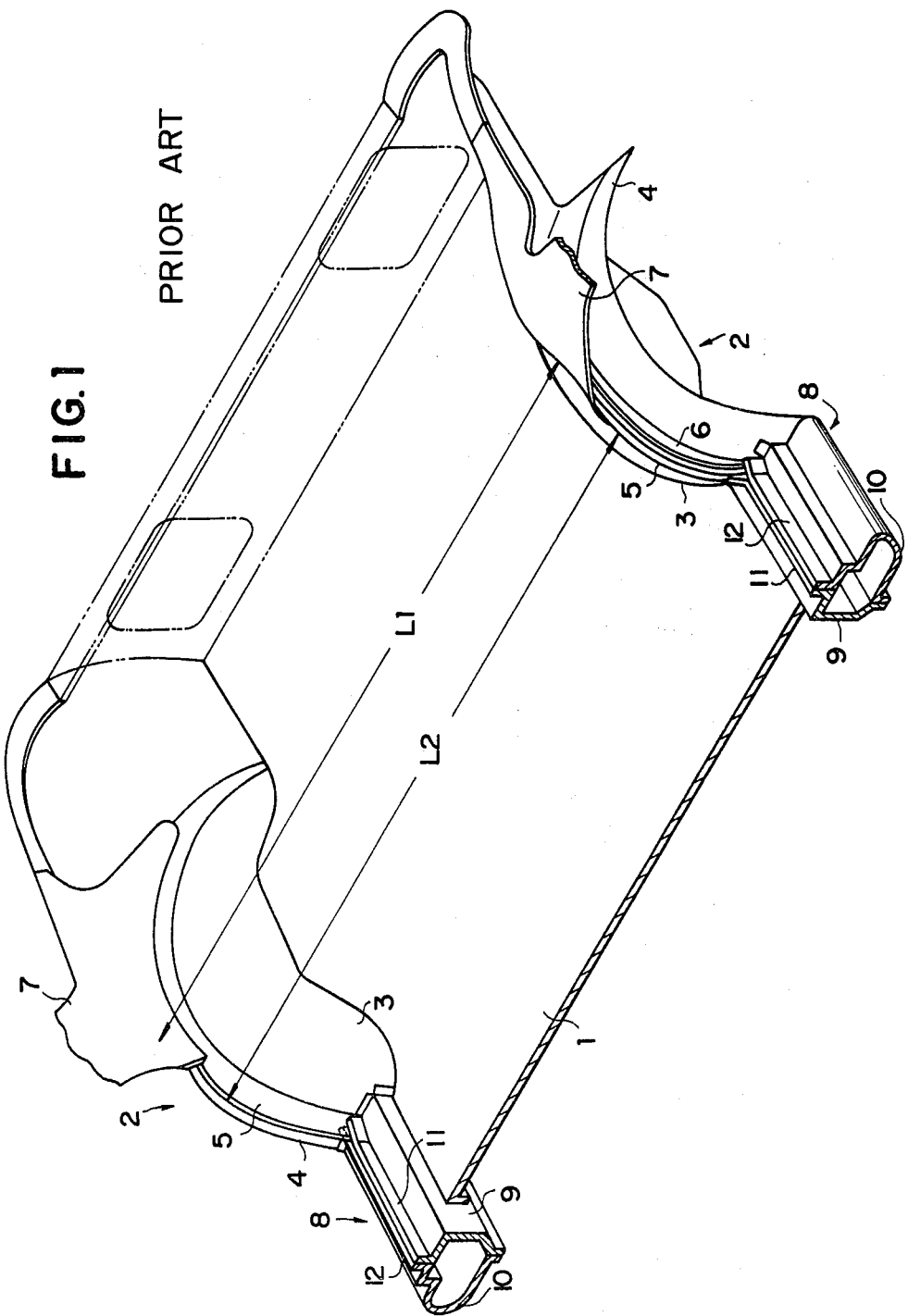
FIG. 1 is a fragmentary perspective view showing a prior-art vehicle body structure.
Figure 2:
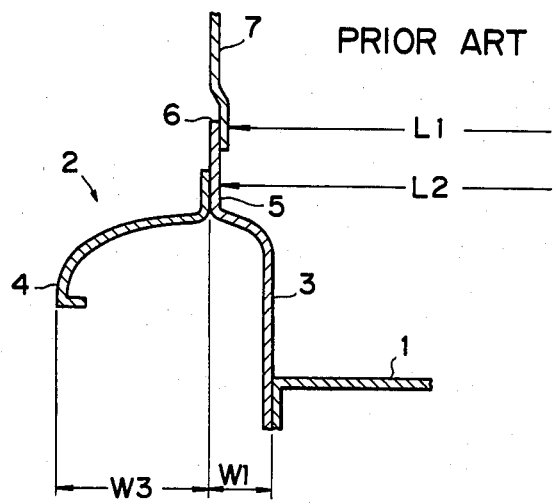
FIG. 2 is a fragmentary cross sectional view of the prior-art vehicle body structure illustrated in FIG. 1.
Figure 3:
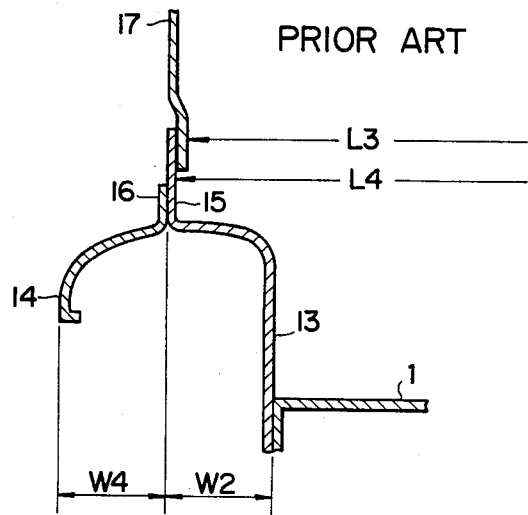
FIG. 3 is a fragmentary cross-sectional view similar to FIG. 2 but showing another prior-art vehicle body structure.
Figure 4:
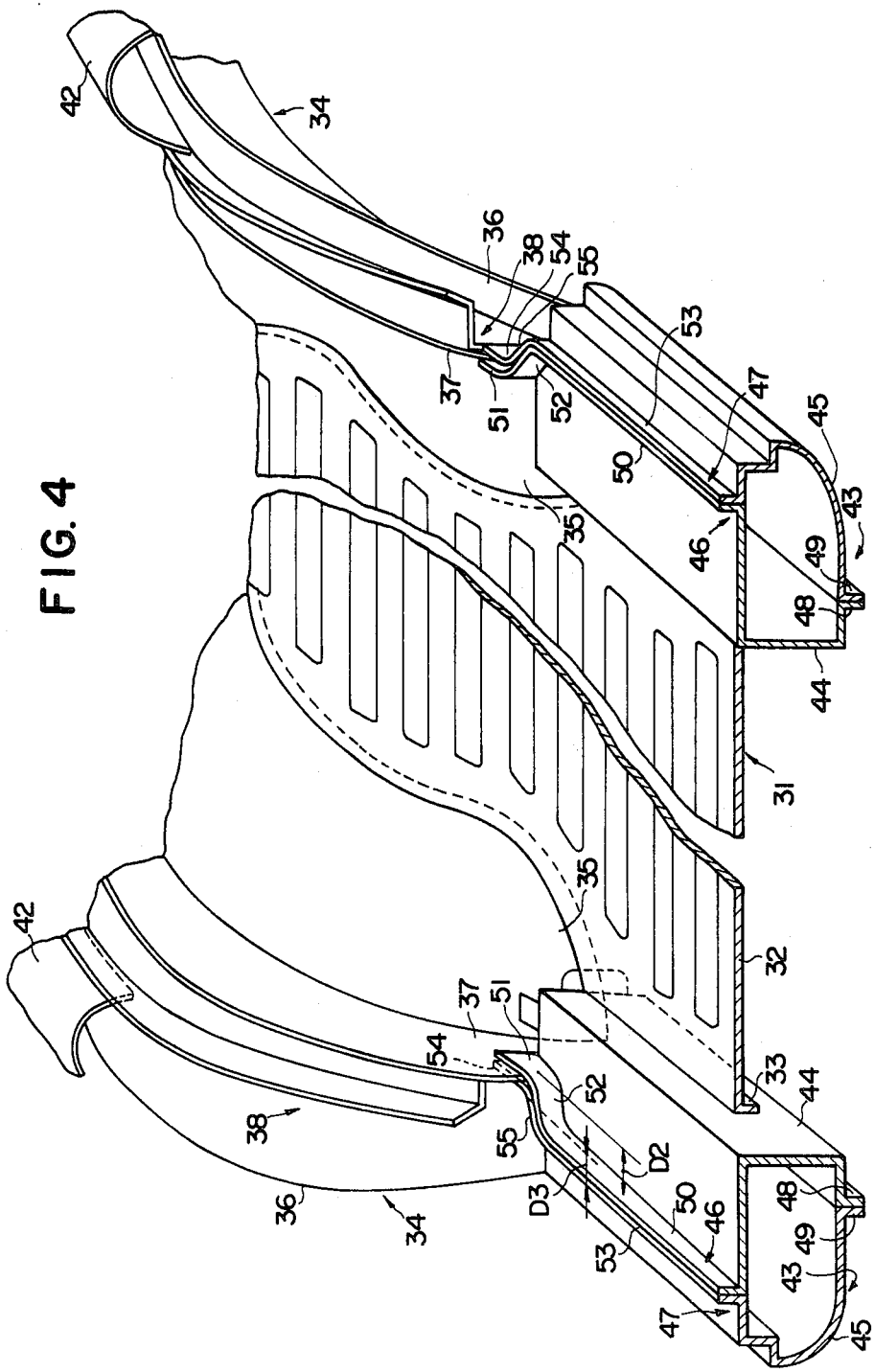
FIG. 4 is a fragmentary perspective view of a vehicle body structure according to the present invention.
Figure 5:
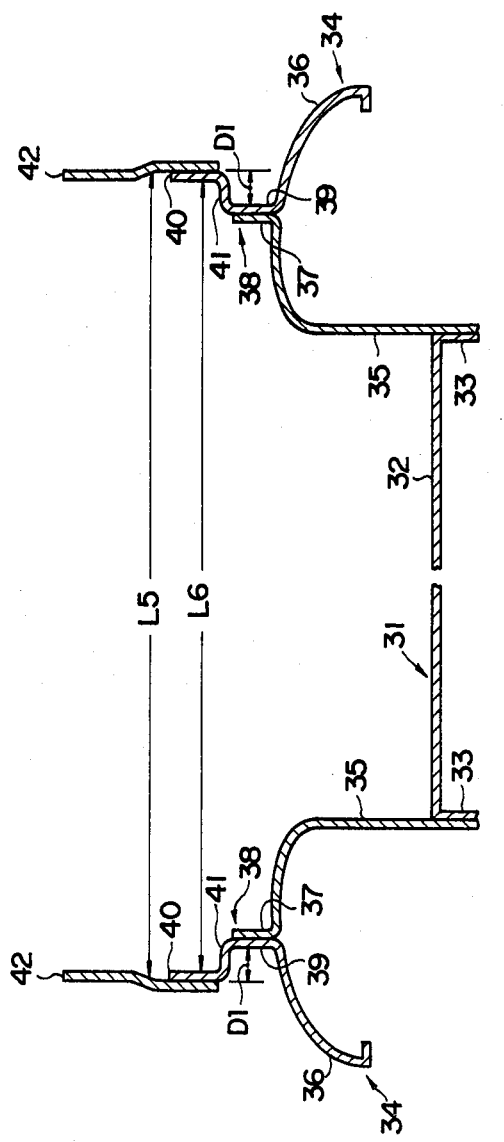
FIG. 5 is a fragmentary cross-sectional view of the vehicle body structure illustrated in FIG. 4.

FIGS. 4 and 5 of the drawings show one of the preferred embodiments of the vehicle body structure according to the present invention. The vehicle body structure is constructed and arranged in such a manner as to be symmetrical with respect to the center axis extending in a longitudinal direction of a vehicle. Therefore, only right half of the vehicle body structure will be described hereinafter and the description of the left half thereof will be omitted for simplicity since the component members and panels forming part of the left half of the vehicle body structure are substantially identical to those of the right half thereof. However, the component members and panels of the left half similar to respective counterparts in the right half are indicated by like reference numerals. In this instance, the terms "right" and "left" are determined when seen from the rear end to the fore end of the vehicle body structure although the right and left halves of the vehicle body structure are seen as diametrically opposite in FIG. 4.

In FIG. 4, the vehicle body structure embodying the present invention is shown comprising a rear floor panel 31 which includes a flat portion 32 having a right lateral end and a flange portion 33 downwardly projecting from the right lateral end of the flat portion 32. Generally indicated at 34 is a rear wheel housing which comprises an inner housing half portion 35 welded or otherwise securely connected to the flange portion 33 of the rear floor panel 31, an outer housing half portion 36 disposed laterally outwardly of the inner housing half portion 35, and inner and outer flange portions 37 and 38 respectively integrally formed with the respective housing half portions 35 and 36. The inner flange portion 37 radially extends outwardly from the outer circumference of the inner housing half portion 35. The outer flange portion 38 is so deformed or bent as to have a lower section 39 extending radially outwardly from the outer circumference of the outer housing half portion 36, an upper section 40 outwardly offset from the lower section 39 in a lateral direction of the rear wheel housing 34 by a predetermined distance D1, and an intermediate section 41 integral with the lower and upper sections 39 and 40 as best shown in FIG. 5. The inner flange portion 37 is welded or otherwise securely connected to the lower section 39 of the outer flange portion 38 for forming in combination the rear wheel housing 34 in conjunction with the inner and outer housing half portions 35 and 36, so that the rear wheel housing 34 can serve to partially accommodate therewithin a rear road wheel, not shown, as in a well known manner. Reference numeral 42 designates a rear pillar inner panel which has a lower section also welded or otherwise securely connected to the upper section 40 of the outer flange portion 38. A left rear pillar inner panel only indicated by the reference numeral 42 also has a lower section which is substantially parallel with and spaced apart from the lower section of the right rear pillar inner panel 42 by a distance L5, the distance L5 being determined in such a manner as to meet the requirement of a vehicle with a certain width. An upper section, only indicated by reference numeral 40, of the left rear pillar inner panel 42 is also parallel with and spaced apart from the upper section 40 of the right rear pillar inner panel 42 by a distance L6 which is approximately equal to the distance L5.

A side sill 43 is shown in FIG. 4 as comprising inner and outer side sill half portions 44 and 45, upper flange portions 46 and 47 respectively extending upwardly from the upper ends of the side sill half portions 44 and 45, and lower flange portions 48 and 49 also extending downwardly from the lower ends of the side sill half portions 44 and 45, respectively, the upper and lower flange portions 46 and 48 being respectively welded or otherwise securely connected to the upper and lower flange portions 47 and 49 for forming in combination the side sill 43 in conjunction with the side sill half portions 44 and 45. The inner side sill half portion 44 of the side sill 43 is welded or otherwise securely connected along the longitudinal direction thereof to the flange portion 33 of the rear floor panel 31 forwardly of the rear wheel housing 34. The upper flange portion 46 has a front section 50 extending in the longitudinal direction of the inner side sill half portion 44, a rear section 51 offset laterally inwardly from the front section 50 by a predetermined distance D2, and an intermediate section 52 integrally connected at longitudinally opposite ends to the front and rear sections 50 and 51, respectively. The rear section 51 is adapted to be substantially in parallel with the front section 50 and inner flange portion 37. Similarly, the upper flange portion 47 has a front section 53 extending in the longitudinal direction of the outer side sill half portion 45, a rear section 54 offset laterally inwardly from the front section 53 by a predetermined distance D3 which is approximately equal to the distance D2, and an intermediate section 55 integrally connected at longitudinally opposite ends to the front and rear sections 53 and 54. The rear section 54 is adapted to be substantially in parallel with the front section 53 and the inner flange portion 37 as in the case of the rear section 51 described hereinbefore. With such a construction, consequently, the rear sections 51 and 53 can sandwitch the inner flange portion 37 therebetween.

In order to vary the distance L5 between the rear pillar inner panels 42 in this embodiment of the present invention shown in FIGS. 4 and 5, it is required to change the outer housing half portions 36 and the outer flange portions 38 into outer housing half portions 56 and outer flange portions 57, respectively, which will be described hereinafter with respect to FIGS. 6 and 7.

Figure 6:
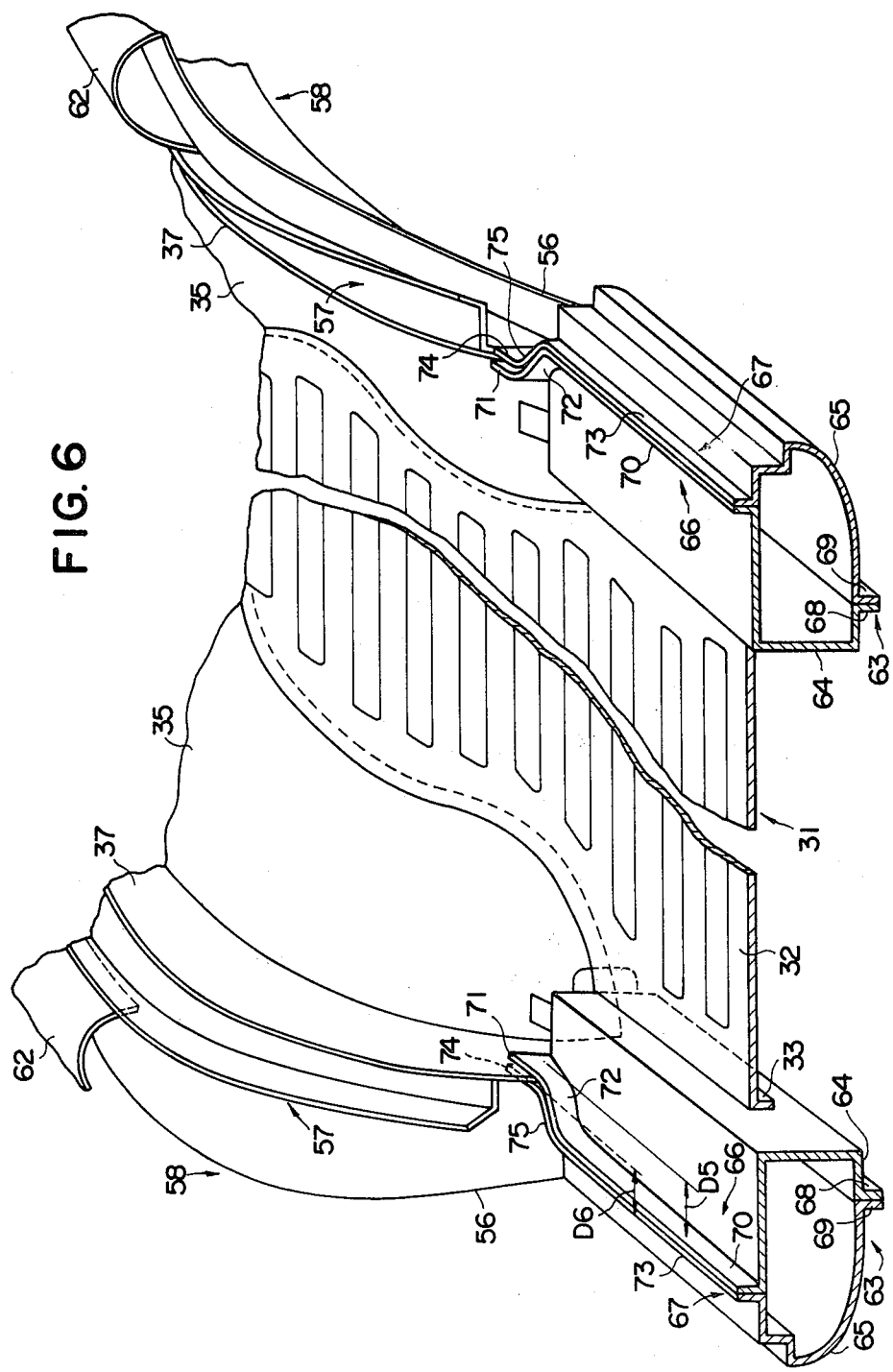
FIG. 6 is a fragmentary cross-sectional view similar to FIG. 4 but showing the vehicle body structure used for a vehicle having a different width.

In FIGS. 6 and 7, a vehicle body structure is shown and used for a vehicle having another width which is greater than that of the vehicle body structure described hereinbefore. In FIGS. 6 and 7, structural components similar to those forming part of the vehicle body structure shown in FIGS. 4 and 5 are also designated by like reference numerals. The vehicle body structure shown in FIGS. 6 and 7 comprises an outer housing half portion 56 and an outer flange portion 57 which constitute a rear wheel housing 58 in conjunction with the inner housing half portion 35 and the inner flange portion 37. The outer flange portion 57 is so deformed or bent as to have a lower section 59 extending radially outwardly from the outer circumference of the outer housing half portion 56, an upper section 60 outwardly offset from the lower section 59 in a lateral direction of the rear wheel housing 58 by a predetermined distance D4, and an intermediate section 61 integral with the lower and upper sections 59 and 60, the distance D4 being greater than the distance D1. A rear pillar inner panel 62 is welded or otherwise securely connected to the upper section 60 of the outer flange portion 57 and is parallel with and spaced apart from the left rear pillar inner panel, only indicated by reference numeral 62, by a distance L7 greater than the distance L5. The upper section of the left outer flange portion only indicated by the reference numeral 57 is also parallel with and spaced apart from the upper section 60 of the right outer flange portion 57 by a distance L8 greater than the distance L6. The outer flange portion 57 is bent in such a manner that the distance D4 is greater than the distance D1 for meeting the requirement of the vehicle.

It is therefore understood that the distance L7 can be varied from the distance L5 only by changing the outer housing half portions 56 and the outer flange portions 57 with the distance D4 without changing the inner housing half portions 35 and the inner flange portions 37.

The vehicle body structure shown in FIGS. 6 and 7 further comprises a side sill 63 having inner and outer side sill half portions 64 and 65, upper flange portions 66 and 67 respectively extending upwardly from the upper ends of the side sill half portions 64 and 65, and lower flange portions 68 and 69 also extending downwardly from the lower ends of the side sill half portions 64 and 65, respectively, the upper and lower flange portions 66 and 68 being respectively welded or otherwise securely connected to the upper and lower flange portions 67 and 69 for forming in combination the side sill 63 in conjunction with the side sill half portions 64 and 65. The inner side sill half portion 64 is welded or otherwise securely connected along the longitudinal direction thereof to the flange portion 33 of the rear floor panel 31 forwardly of the rear wheel housing 58. The upper flange portion 66 has a front section 70 extending in the longitudinal direction of the inner side sill half portion 64, a rear section 71 offset laterally inwardly from the front section 70 by a predetermined distance D5, and an intermediate section 72 integrally connected at longitudinally opposite ends to the front and rear sections 70 and 71, respectively. The rear section 71 is adapted to be in parallel with the front section 70 and the inner flange portion 37. Similarly, the upper flange portion 67 has a front section 73 extending in the longitudinal direction of the outer side sill half portion 65, a rear section 74 offset laterally inwardly from the front section 73 by a predetermined distance D6 which is approximately equal to the distance D5, and an intermediate section 75 integrally connected at longitudinally opposite ends to the front and rear sections 73 and 74, respectively. The rear section 74 is adapted to be in parallel with the front section 73 and inner flange portion 37 as in the case of the rear section 71 described hereinbefore. The intermediate sections 72 and 75 are respectively bent or deformed in such a manner that the distances D5 and D6 are smaller than the distance D2 and D3, respectively, for meeting the requirement of the vehicle. With such a construction, consequently, the rear section 71 and 74 are also adapted to sandwitch the inner flange portion 37 therebetween.

It is therefore understood that the upper flange portions 66 and 67 can sandwitch the inner flange portions 37, respectively, only by changing the distances D2 and D3 into the distances D5 and D6.

In the vehicle body structure of the present invention thus constructed and arranged, the inner housing half portion 35 and the inner flange portion 37 can be used for the vehicle body structures which have respective distances L6 and L8. Therefore, a number of types of inner housing half portion and inner flange portion are not required when vehicles with different widths are manufactured. This results in the fact that the cost for production of the vehicle body structure can be reduced and that excessive time and labour for storing the components forming part of the vehicle body structure are not required.

What is claimed is:
1. A vehicle body structure, comprising:
a pair of rear wheel housing each having inner and outer housing half portions, and inner and outer flange portions respectively extending radially outwardly from the outer circumference of said housing half portions, said inner and outer flange portions being integral with said housing half portions and connected to each other for forming in combination said rear wheel housing; said outer flange portion being bent in a lateral direction of said rear wheel housing;
a pair of rear pillar inner panels each having a lower end portion connected to each of said outer flange portions; and
a pair of side sills extending in parallel with each other and projecting forwardly from said rear wheel housings, respectively, each of said side sills having inner and outer side sill half portions, and inner and outer flange portions respectively extending upwardly from the upper ends of said side sill half portions, said inner and outer flange portions being integral with said side sill half portions and connected to each other for forming in combination said side sill, said inner and outer flange portions of said side sill extending in longitudinal directions of said side sill to be bent in a lateral direction of said side sill in longitudinal alignment with said inner flange portion of said rear wheel housing for sandwiching said inner flange portion of said rear wheel housing therebetween.

2. A vehicle body structure as set forth in claim 1, wherein each of said outer flange portions of said rear wheel housing includes a lower section, an upper section offset outwardly from said lower section in a lateral direction of said rear wheel housing, and an intermediate section integrally connecting said lower and upper sections.

3. A vehicle body structure as set forth in claim 1, wherein each of said inner and outer flange portions of said side sill includes a fore section, a rear section offset laterally inwardly from said fore section, and an intermediate section integrally connecting said fore and rear sections.

* * * * *